US012653739B2

(12) United States Patent
Cui et al.

(10) Patent No.: US 12,653,739 B2
(45) Date of Patent: Jun. 16, 2026

(54) ANTI-BEDSORE ADJUSTING AND MONITORING SYSTEM AND METHOD

(71) Applicant: BEWATEC (ZHEJIANG) MEDICAL EQUIPMENT CO., LTD, Xiuzhou (CN)

(72) Inventors: Xiutao Cui, Xiuzhou (CN); Hua Wang, Xiuzhou (CN); Lu Liu, Xiuzhou (CN); Jian Pan, Xiuzhou (CN)

(73) Assignee: BEWATEC (ZHEJIANG) MEDICAL EQUIPMENT CO., LTD., Jiaxing City (CN)

( * ) Notice: Subject to any disclaimer, the term of this patent is extended or adjusted under 35 U.S.C. 154(b) by 97 days.

(21) Appl. No.: 18/706,402

(22) PCT Filed: Oct. 27, 2022

(86) PCT No.: PCT/CN2022/127895

§ 371 (c)(1),
(2) Date: May 1, 2024

(87) PCT Pub. No.: WO2023/078148

PCT Pub. Date: May 11, 2023

(65) Prior Publication Data

US 2024/0415714 A1 Dec. 19, 2024

(30) Foreign Application Priority Data

Nov. 2, 2021 (CN) ......................... 202111297242.8

(51) Int. Cl.
*A61G 7/057* (2006.01)

(52) U.S. Cl.
CPC ...... *A61G 7/05776* (2013.01); *A61G 2203/10* (2013.01); *A61G 2203/20* (2013.01)

(58) Field of Classification Search
CPC ............ A61G 7/05776; A61G 2203/10; A61G 2203/20; A61G 7/05769; A61G 2203/34
(Continued)

(56) References Cited

U.S. PATENT DOCUMENTS 5,848,450 A * 12/1998 Oexman ............ A61G 7/05769 5/713
8,745,788 B2 * 6/2014 Bhai .................... A61G 7/0527 5/713
(Continued)

FOREIGN PATENT DOCUMENTS

CA 2095736 C 4/1997
CN 101815491 A 8/2010
(Continued)

OTHER PUBLICATIONS

Chinese Office Action for corresponding application 202111297242.8; Mail date Aug. 1, 2022.
(Continued)

*Primary Examiner* — Justin C Mikowski
*Assistant Examiner* — George Samuel Gines
(74) *Attorney, Agent, or Firm* — CANTOR COLBURN LLP

(57) ABSTRACT

An anti-bedsore adjusting and monitoring system includes an air pressure determination module, an electric mattress and a visualization module. The air pressure determination module is configured to determine a body mass index according to a height and a weight of a target object, determine a target mattress air pressure according to the body mass index and send the target mattress air pressure to the electric mattress. The electric mattress is configured to perform inflation or deflation processing according to the target mattress air pressure, acquire a pressure value corresponding to each target position and send the pressure value
(Continued)

to the visualization module, where the each target position is a position where a corresponding pressure sensor in the electric mattress contacts the target object. The visualization module is configured to determine guidance information corresponding to the pressure value according to the pressure value and display the guidance information.

19 Claims, 3 Drawing Sheets

(58) Field of Classification Search
USPC .............................................................. 5/713
See application file for complete search history.

(56) References Cited

U.S. PATENT DOCUMENTS

| | | | | |
|---|---|---|---|---|
| 2009/0106905 | A1* | 4/2009 | Ochi .................. | A61G 7/05769 177/144 |
| 2014/0059770 | A1 | 3/2014 | Williamson et al. | |
| 2020/0129353 | A1* | 4/2020 | Su ........................ | A61H 9/0078 |
| 2020/0227160 | A1 | 7/2020 | Youngblood et al. | |

FOREIGN PATENT DOCUMENTS

| | | | |
|---|---|---|---|
| CN | 106667700 | A | 5/2017 |
| CN | 107496119 | A | 12/2017 |
| CN | 108742667 | A | 11/2018 |
| CN | 110123554 | A | 8/2019 |
| CN | 112472447 | A | 3/2021 |
| CN | 113509337 | A | 10/2021 |
| CN | 113855431 | A | 12/2021 |
| JP | 2003290297 | A | 10/2003 |

OTHER PUBLICATIONS

International Search Report for corresponding application PCT/CN2022/127895 filed on Oct. 27, 2022; Mail date Dec. 14, 2022.
European Search Report for corresponding application EP 22 88 9173; Nov. 3, 2025.

* cited by examiner

ANTI-BEDSORE ADJUSTING AND MONITORING SYSTEM AND METHOD

CROSS-REFERENCE TO RELATED APPLICATION(S)

This is a national stage application filed under 37 U.S.C. 371 based on International Patent Application No. PCT/CN2022/127895, filed Oct. 27, 2022, which claims priority to Chinese Patent Application No. 202111297242.8 filed with the China National Intellectual Property Administration (CNIPA) on Nov. 2, 2021, the disclosure of which is incorporated herein by reference in its entirety.

TECHNICAL FIELD

Embodiments of the present application relate to the technical field of medical care devices, for example, an anti-bedsore adjusting and monitoring system and method.

BACKGROUND

Many patients need to stay in bed for a long time due to movement disorders or medical conditions. Hospitals and families are required to turn the patients over regularly to avoid bedsores. For hospitals, this requires a significant investment of nursing manpower, energy and material resources. For families, specialized care is required all day long. If turning over is not done timely, it is highly likely to increase the possibility of pressure sores, affecting the patients' physical health, while turning over at night disturbs the patients' rest.

In the related art, electric mattresses are used, and medical workers check the conditions of the mattresses regularly. The patients are provided with bedsore prevention programs based on the patients' conditions, and caregivers adjust the mattresses according to the bedsore prevention programs. However, this method relies on empiricism, and the adjustment effect may not meet the patients' requirements, also causing a heavy nursing workload.

SUMMARY

Embodiments of the present application provide an anti-bedsore adjusting and monitoring system and method to provide an electric mattress with a suitable air pressure for a target object while providing real-time pressure monitoring and reminders so that the pressure can be ensured to always remain in a comfortable state.

In a first aspect, an embodiment of the present application provides an anti-bedsore adjusting and monitoring system. The system includes an air pressure determination module, an electric mattress and a visualization module.

The air pressure determination module is communicatively connected to the electric mattress and is configured to determine a body mass index according to a height and a weight of a target object, determine a target mattress air pressure according to the body mass index and send the target mattress air pressure to the electric mattress.

The electric mattress is communicatively connected to the visualization module and is configured to receive the target mattress air pressure, perform inflation or deflation processing according to the target mattress air pressure, acquire a pressure value corresponding to each target position, and send the pressure value to the visualization module, where the each target position is a position where a corresponding pressure sensor in the electric mattress contacts the target object.

The visualization module is configured to receive and visually display the pressure value, determine guidance information corresponding to the pressure value according to the pressure value and display the guidance information.

In a second aspect, an embodiment of the present application further provides an anti-bedsore adjusting and monitoring method. The method includes the steps below.

An air pressure determination module determines a body mass index according to a height and a weight of a target object, determines a target mattress air pressure according to the body mass index and sends the target mattress air pressure to an electric mattress.

The electric mattress receives the target mattress air pressure, performs inflation or deflation processing according to the target mattress air pressure and acquires a pressure value corresponding to each target position according to the target mattress air pressure and sends the pressure value to a visualization module, where the each target position is a position where a corresponding pressure sensor in the electric mattress contacts the target object.

The visualization module receives and visually displays the pressure value, determines guidance information corresponding to the pressure value according to the pressure value and displays the guidance information.

BRIEF DESCRIPTION OF DRAWINGS

Drawings used in the embodiments are briefly described hereinafter. Apparently, the drawings described below are part, not all, of the drawings of the embodiments of the present application.

Those of ordinary skill in the art may obtain other drawings based on the drawings described below on the premise that no creative work is done.

DETAILED DESCRIPTION

Figure 1:
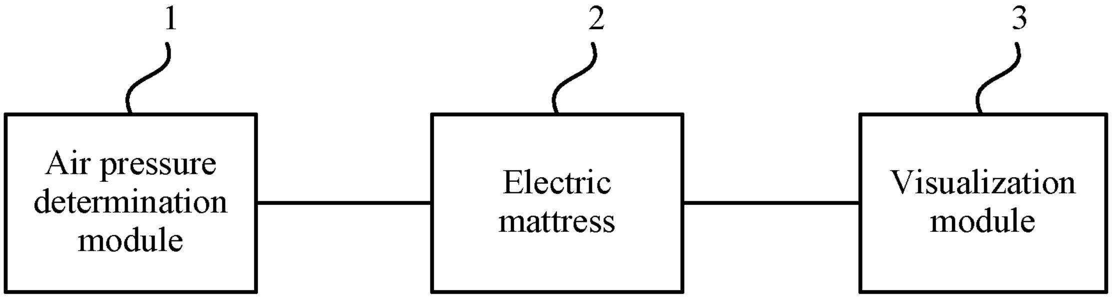
FIG. 1 is a diagram illustrating the structure of an anti-bedsore adjusting and monitoring system according to embodiment one of the present application.

The present application is described below in conjunction with drawings and embodiments. It is to be understood that the embodiments described herein are intended to illustrate the present application. Additionally, it is to be noted that for ease of description, only part, not all, of structures related to the present application are illustrated in the drawings.

Embodiment One

FIG. 1 is a diagram illustrating the structure of an anti-bedsore adjusting and monitoring system according to embodiment one of the present application. This embodiment is applicable to the case of performing air pressure management on an electric mattress. The system may perform an anti-bedsore adjusting and monitoring method and may be implemented in the form of software and/or hardware. The hardware may be an electronic device. Optionally, the electronic device may be a mobile terminal or the like.

As shown in FIG. 1, the system in this embodiment includes an air pressure determination module 1, an electric mattress 2 and a visualization module 3.

In this embodiment, the air pressure determination module 1 is communicatively connected to the electric mattress 2 and is configured to determine a body mass index according to a height and a weight of a target object, determine a target mattress air pressure according to the body mass index and send the target mattress air pressure to the electric mattress 2; the electric mattress 2 is communicatively connected to the visualization module 3 and is configured to receive the target mattress air pressure, perform inflation or deflation processing according to the target mattress air pressure, acquire a pressure value corresponding to each target position, and send the pressure value to the visualization module 3, where the each target position is a position where a corresponding pressure sensor in the electric mattress contacts the target object; and the visualization module 3 is configured to receive and visually display the pressure value, determine guidance information corresponding to the pressure value according to the pressure value and display the guidance information.

The air pressure determination module 1 is configured to determine the body mass index according to the height and the weight of the target object, determine the target mattress air pressure according to the body mass index and send the target mattress air pressure to the electric mattress 2.

In this embodiment, the target object may be a patient who is bedridden and has restricted movement. The body mass index may be a numerical value for measuring the degree of obesity of a human body. The target mattress air pressure may be an air pressure in an electric mattress that is adapted to the target object. The electric mattress 2 may be a mattress that can be charged or discharged through electric control to adjust the softness of the mattress.

In an embodiment, the air pressure determination module 1 may acquire the height and the weight of the target object and input the height and the weight into a calculation formula of the body mass index to determine the body mass index of the target object. Further, that the target mattress air pressure corresponding to the body mass index is determined may be that the target mattress air pressure is determined through a preset correspondence relationship or may also be that the target mattress air pressure is determined through a preset function relationship. Moreover, the target mattress air pressure may be sent to the electric mattress 2 so that the electric mattress 2 can be adjusted according to the target mattress air pressure.

It is to be noted that the body mass index (BMI), also known as a BMI index, is a commonly used international standard for measuring the degree of obesity and health of a human body. The calculation formula of the body mass index is that BMI=weight÷height$^2$. (Weight unit: kilogram (kg); and height unit: meter (m)).

Exemplarily, the height and the weight of the target object may be input in advance so that the body mass index can be calculated. For example, in a hospital, the height and the weight of the target object may be measured at the time of admission detection. For example, the height is 1.6 m, and the weight is 50 kg. According to the height, the weight and the calculation formula of the body mass index, it is calculated that the body mass index=50÷1.6$^2$=19.53. According to a correspondence relationship between the body mass index and a mattress air pressure, the target mattress air pressure may be determined as 5.50 kPa and sent to the electric mattress 2.

Exemplarily, since the body mass index of the target object is associated with the target mattress air pressure, the target mattress air pressure may be determined through a following formula:

$$P = 3.835 + BMI \times 0.379^2.$$

P denotes the target mattress air pressure, air pressure unit is kilopascal (kPa), and BMI denotes the body mass index of the target object.

It is to be noted that the preceding formula for determining the target mattress air pressure is only a manner for determining the target mattress air pressure. In an actual application process, other manners may be used for determining the target mattress air pressure, or adjustments may also be made to the preceding formula.

The electric mattress 2 is configured to receive the target mattress air pressure, perform the inflation or deflation processing according to the target mattress air pressure and acquire the pressure value corresponding to the each target position according to the target mattress air pressure and send the pressure value to the visualization module 3.

In this embodiment, multiple pressure sensors for measuring the current pressure are installed in the electric mattress 2 and may be evenly distributed throughout the electric mattress 2. The each target position may be a position where the corresponding pressure sensor in the electric mattress 2 contacts the target object. The pressure value may be a numerical value measured by the corresponding pressure sensor at the each target position.

Exemplarily, the electric mattress 2 receives the target mattress air pressure sent by the air pressure determination module 1 and adjusts the current mattress air pressure through inflation or deflation according to the target mattress air pressure so that the current mattress air pressure can reach the target mattress air pressure. Further, the pressure value of the each target position is measured by the corresponding pressure sensor on the electric mattress and is sent to the visualization module 3 so that the pressure value can be visualized and analyzed through the visualization module 3.

The visualization module 3 is configured to receive and visually display the pressure value, determine the guidance information corresponding to the pressure value according to the pressure value and display the guidance information.

In this embodiment, the guidance information may be guidance information for guiding nursing personnel to perform an operation, such as a prompt for guiding a position change or a mode adjustment.

Optionally, the visualization module 3 may receive the pressure value sent by the electric mattress 2 and perform an analysis according to the pressure value to determine whether the pressure value meets a requirement of the target object. Moreover, the guidance information corresponding to the pressure value may be determined according to the pressure value and is displayed so that a caregiver can adjust the posture of the target object according to the guidance information to avoid bedsores.

In this embodiment, the air pressure determination module determines the body mass index according to the height and the weight of the target object, determines the target mattress air pressure according to the body mass index and sends the target mattress air pressure to the electric mattress, the electric mattress receives the target mattress air pressure, performs the inflation or deflation processing according to the target mattress air pressure and acquires the pressure value corresponding to the each target position according to the target mattress air pressure and sends the pressure value to the visualization module, and the visualization module receives and visually displays the pressure value, determines the guidance information corresponding to the pressure value according to the pressure value and displays the guidance information. This approach addresses issues such as the inability to monitor the electric mattress in real-time and the inability to provide suitable mattress air pressures for different users, enabling the provision of an electric mattress with a suitable air pressure for the target object, alleviating nursing workload, and preventing bedsores.

Embodiment Two

Referring to FIG. 1, based on the preceding embodiment, modifications are made to a specific implementation of performing air pressure adjustment on the electric mattress 2 by the air pressure determination module 1 in embodiment two of the present application. Explanations of terms identical to or corresponding to terms in the preceding embodiment are not repeated herein.

Optionally, the air pressure determination module 1 is further configured to determine a mattress inflation air pressure or a mattress deflation air pressure according to the target mattress air pressure and send the mattress inflation air pressure or the mattress deflation air pressure to the electric mattress 2 according to a preset cycle; and the electric mattress 2 is further configured to receive the mattress inflation air pressure or the mattress deflation air pressure and perform the inflation or deflation processing according to the mattress inflation air pressure or the mattress deflation air pressure.

In this embodiment, the mattress inflation air pressure may have an air pressure value higher than the target mattress air pressure so that the electric mattress 2 can be inflated intermittently. The mattress deflation air pressure may have an air pressure value lower than the target mattress air pressure so that the electric mattress 2 can be deflated intermittently. The preset cycle may be an adjustment cycle during which the electric mattress 2 is controlled to inflate and deflate alternately.

Exemplarily, the air pressure determination module 1 may determine the mattress inflation air pressure or the mattress deflation air pressure according to the target mattress air pressure. For example, this may be that the mattress inflation air pressure=the target mattress air pressure×(1+5%) and that the mattress deflation air pressure=the target mattress air pressure×(1×5%). Specific numerical values may be adjusted according to actual cases. According to the preset cycle, the mattress inflation air pressure or the mattress deflation air pressure is sent to the electric mattress 2 so that the electric mattress 2 can fluctuate cyclically. When receiving the mattress inflation air pressure or the mattress deflation air pressure, the electric mattress 2 performs the inflation or deflation processing according to the mattress inflation air pressure or the mattress deflation air pressure so that the mattress air pressure of the electric mattress 2 can reach the required air pressure.

Exemplarily, according to the preset cycle, 0 to 20 min is determined for the target mattress air pressure, 20 to 40 min is determined for the mattress inflation air pressure, 40 to 60 min is determined for the target mattress air pressure, and 60 to 80 min is determined for the mattress deflation air pressure. A corresponding mattress air pressure value is sent to the electric mattress 2 at a corresponding moment so that the electric mattress 2 can fluctuate cyclically. Optionally, the visualization module 3 is configured to receive and visually display the pressure value and generate and display, in response to the pressure value reaching a guidance condition, guidance information corresponding to the guidance condition. The guidance condition may be a condition generated according to the pressure value and the duration of the pressure value and is configured to generate the guidance information. Exemplarily, the visualization module 3 receives and visually displays the pressure value so that the caregiver can intuitively understand the pressure value between the target object and the electric mattress 2. Moreover, when the pressure value meets the guidance condition, the current target object may be at the risk of pressure sores. At this time, the guidance information corresponding to the guidance condition may be displayed to remind the caregiver to perform corresponding operations. Optionally, the guidance information may include information such as adjusting the mode of the electric mattress or needing to adjust the position of the target object.

Exemplarily, when the pressure value exceeds 2.13 kPa (160 mmHg), the capillary perfusion to the tissue may be blocked. The pressure value above 4 to 4.6 kPa (30 to 35 mmHg) for 2 to 4 hours may cause pressure sores. Therefore, the guidance condition may be set as that the pressure value is greater than or equal to 4 kPa and that the duration reaches 1.5 hours. When the guidance condition is met, text reminder information is generated and displayed, such as "please adjust the working mode of the electric mattress to a fluctuation cycle mode" or "please help turn a patient over". The guidance condition may also be set as that the pressure value is equal to 4 kPa and that the duration reaches 2 hours. When the guidance condition is met, the text reminder information is generated and displayed, and the guidance information may also be reminded strongly and sent to a terminal device of the caregiver such as a smartphone. This can enable the caregiver to acquire the guidance information and return to the bedside timely to perform corresponding operations when the caregiver is not by the bed.

Optionally, the air pressure determination module 1 is further configured to determine at least one to-be-adjusted airbag corresponding to each target moment within a fluctuation cycle mode and an airbag air pressure corresponding to each of the at least one to-be-adjusted airbag according to the target mattress air pressure, and send the airbag air pressures of the at least one to-be-adjusted airbag corresponding to the each target moment to the electric mattress 2 at the each target moment, where the electric mattress 2 includes at least two airbags; the electric mattress 2 is further configured to receive the airbag air pressures corresponding to the at least one to-be-adjusted airbag and inflate or deflate each to-be-adjusted airbag according to an airbag air pressure corresponding to the each to-be-adjusted airbag in the fluctuation cycle mode.

In this embodiment, the fluctuation cycle mode may be a mode in which different airbags in the electric mattress are controlled to inflate and deflate alternately, and the each target moment may be each moment within the fluctuation cycle mode. The at least one to-be-adjusted airbag may include multiple airbags involved in the fluctuation cycle mode. The airbag air pressure may be an air pressure that needs adjusting and corresponds to the each to-be-adjusted airbag.

Exemplarily, in the fluctuation cycle mode, the air pressure determination module 1 may determine airbags on which inflation or deflation adjustments are performed in a fluctuation cycle process and determine an airbag that corresponds to the each target moment and needs adjusting as the each to-be-adjusted airbag. In an embodiment, the airbag air pressure of the each to-be-adjusted airbag at the each target moment may be determined so that the electric mattress 2 can inflate or deflate different to-be-adjusted airbags to achieve a fluctuation cycle effect.

Exemplarily, multiple airbags on the electric mattress may be numbered. For example, 1 to 14 is numbered sequentially from the head to the feet of the target object. Airbags No. 1 and No. 2 correspond to the head and the neck of the target object and do not require inflation or deflation in the fluctuation cycle stage. Airbags No. 3 to No. 14 correspond to the torso parts of the target object and require inflation or deflation adjustments in the fluctuation cycle stage. In this case, the airbags No. 3 to No. 14 may serve as the to-be-adjusted airbags. In the fluctuation cycle mode, the multiple to-be-adjusted airbags are alternately inflated or deflated cyclically. For example, odd-numbered to-be-adjusted airbags (No. 3, No. 5, No. 7, No. 9, No. 11 and No. 13) are in the filled state, with an air pressure determined according to the target mattress air pressure, even-numbered to-be-adjusted airbags (No. 4, No. 6, No. 8, No. 10, No. 12 and No. 14) are in the deflated state, when an alternation cycle is reached, the even-numbered to-be-adjusted airbags are inflated to the filled state, with an airbag air pressure determined according to the target mattress air pressure, and the odd-numbered to-be-adjusted airbags are deflated.

It is to be noted that the preceding fluctuation cycle mode is an exemplary illustration.

The advantage of the preceding function lies in regularly reducing the patient's pressure through intermittent inflation and deflation. Due to sensory disturbance and decreased muscle tone, a hemiplegic patient needs to relax his limbs. The nursing workload is alleviated through the fluctuation cycle mode so that the hemiplegic patient can relax his body, lie down more comfortably and also alleviate the skin friction.

Figure 2:
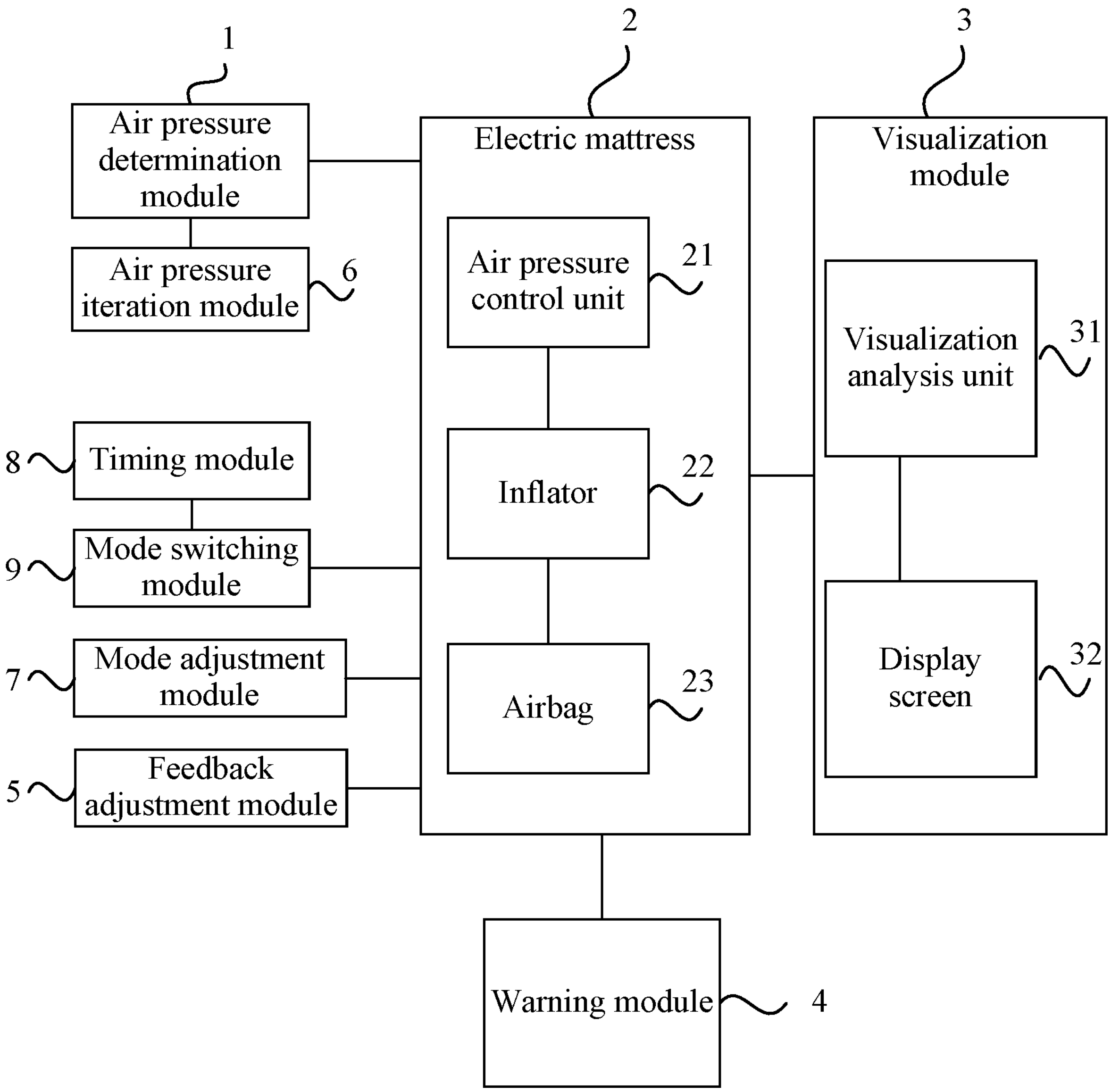
FIG. 2 is a diagram illustrating the structure of an anti-bedsore adjusting and monitoring system according to embodiment two of the present application.

FIG. 2 is a diagram illustrating the structure of an anti-bedsore adjusting and monitoring system according to embodiment two of the present application.

Optionally, as shown in FIG. 2, to improve the automation of the anti-bedsore adjusting and monitoring system, the system may further include a mode adjustment module 7. The mode adjustment module 7 is connected to the electric mattress 2 and is configured to receive the pressure value and switch, in response to the pressure value reaching a mode switching condition, the working mode of the electric mattress 2.

In this embodiment, the mode switching condition may be a condition for switching the working mode of the electric mattress 2, for example, the pressure value A lasts for 2 hours, or the posture of the target object is adjusted. Working modes may include modes such as dual tube fluctuation, sitting posture, nursing, static state and turning over.

Optionally, the mode adjustment module 7 receives the pressure value corresponding to the each target position and determines, according to the pressure value, whether the mode switching condition is reached and which mode switching condition is reached. Further, according to the mode switching condition, the working mode of the electric mattress 2 is switched and adjusted to save the caregiver's time of manual switching and also to avoid pressure sores caused by the caregiver's inability to adjust the working mode timely.

It is to be noted that the mode switching condition may be set according to the pressure value and the duration of the pressure value.

Optionally, the electric mattress 2 includes an air pressure control unit 21, an inflator 22 and at least two airbags 23.

The air pressure control unit 21 is communicatively connected to the air pressure determination module 1 and is configured to receive the target mattress air pressure and control the inflator 22 to inflate or deflate the at least two airbags 23 according to the target mattress air pressure so that air pressures in the at least two airbags 23 can reach the target mattress air pressure.

The inflator 22 may include an inflation compressor and a solenoid valve and is configured to inflate or deflate the at least two airbags 23.

Optionally, the air pressure control unit 21 receives the target mattress air pressure sent by the air pressure determination module 1 and controls the inflator 22 according to the target mattress air pressure to inflate or deflate the at least two airbags 23 through the inflator 22. When the air pressures in the at least two airbags 23 meet the target mattress air pressure, the inflation or deflation is stopped, which may be caused by air leakage through the solenoid valve placed on the at least two airbags 23.

Optionally, to ensure the safety of the system and guarantee the safety of the target object, the system further includes a warning module 4.

The warning module 4 is connected to the electric mattress 2 and is configured to generate and send warning information in response to detecting a to-be-warned situation. The to-be-warned situation includes a situation where the electric mattress 2 is in a low-voltage state, a power-off state, or an unfilled state. The warning information may be information for prompting the fault of the electric mattress 2 and may be in the form of text or voice.

Optionally, the warning module 4 may detect the working status of the electric mattress 2. In the case where the warning module 3 detects that the electric mattress 2 is in the low-voltage state, the power-off state, or the unfilled state, the electric mattress 2 cannot work normally. At this time, the warning module 4 may generate and send the warning information so that the caregiver can troubleshoot and avoid adverse influences on the target object.

Exemplarily, when the warning module 4 detects that the electric mattress 2 is in the low-voltage state, the warning information may be sent to the terminal device of the caregiver, or the caregiver may also be reminded to pay attention in the form of voice broadcasting to repair the electric mattress 2 and to make the electric mattress 2 work normally.

Optionally, the comfort degree may also be reminded through the warning module 4. This may be that the warning module 4 is further configured to acquire the pressure value corresponding to the each target position in the electric mattress 2, determine the current pressure state according to the pressure value and a comfort pressure value and generate and send reminder information in response to the current pressure state being an uncomfortable state.

In this embodiment, the comfort pressure value may be a pressure value that is preset and conforms to the comfort degree of a human body. Optionally, the comfort pressure value may be a pressure value range. The current pressure state may include two types: comfort and discomfort. The reminder information may be information for reminding the caregiver to manually adjust the current pressure state in response to the current pressure state not meeting the requirement and may be text information or voice information.

Optionally, the warning module 4 may acquire the pressure value corresponding to the each target position in the electric mattress 2 and determine the comfort degree of the target object through the pressure value. Further, the pressure value is compared with the comfort pressure value. In the case where the pressure value does not meet the requirement of the comfort pressure value, the air pressure of the electric mattress 2 cannot meet the requirement at this time, the current pressure state is determined to be an uncomfortable state, and the reminder information is generated and sent to remind the caregiver to adjust the air pressure of the electric mattress 2. In the case where the pressure value meets the requirement of the comfort pressure value, the air pressure of the electric mattress 2 can meet the requirement at this time, and the monitoring is continued.

Optionally, the anti-bedsore adjusting and monitoring system further includes a feedback adjustment module 5.

The feedback adjustment module 5 is connected to the electric mattress 2 and is configured to acquire the pressure value corresponding to the each target position in the electric mattress 2, determine the current pressure state according to the pressure value and the comfort pressure value, determine a feedback mattress air pressure according to the pressure value and the comfort pressure value in response to the current pressure state being uncomfortable and send the feedback mattress air pressure to the electric mattress; the electric mattress 2 is further configured to receive the feedback mattress air pressure and perform the inflation or deflation processing according to the feedback mattress air pressure. The feedback mattress air pressure may have an air pressure value that needs adjusting for the current mattress air pressure.

Optionally, the pressure value corresponding to the each target position in the electric mattress 2 is acquired, and the comfort degree of the target object may be determined through the pressure value. Further, the pressure value is compared with the comfort pressure value, in the case where the pressure value does not meet the requirement of the comfort pressure value, the air pressure of the electric mattress 2 cannot meet the requirement at this time, the current pressure state is determined to be uncomfortable, and the mattress air pressure of the electric mattress 2 needs adjusting automatically. An adjustment manner may be that the feedback mattress air pressure is determined according to the pressure value and the comfort pressure value to inflate or deflate the electric mattress 2 through the feedback mattress air pressure. In the case where the pressure value meets the requirement of the comfort pressure value, the air pressure of the electric mattress 2 can meet the requirement at this time, adjustments are not required, and the monitoring is continued.

Optionally, to increase the determination accuracy of the target mattress air pressure, the anti-bedsore adjusting and monitoring system further includes an air pressure iteration module 6.

The air pressure iteration module 6 is connected to the air pressure determination module 1 and is configured to acquire a skin pressure condition and a subjective feeling of the target object, update an air pressure regression equation according to the body mass index, the skin pressure condition and the subjective feeling and send the updated air pressure regression equation to the air pressure determination module 1.

In this embodiment, the air pressure regression equation is configured to determine the target mattress air pressure according to the body mass index. The skin pressure condition may include whether the skin is reddish due to pressure, or the current skin state. The subjective feeling may be the target object's subjective feeling of the softness of the mattress, such as satisfaction or dissatisfaction.

Optionally, at some regular times, a medical worker may evaluate the skin pressure condition of the target object and ask the target object about the subjective feeling of the softness of the mattress. According to the body mass index, the skin pressure condition and the subjective feeling, data is summarized and processed. The air pressure regression equation may be updated and constructed, and the updated air pressure regression equation is fed back to the air pressure determination module 1 so that the air pressure determination module 1 can determine a subsequent target mattress air pressure according to the updated air pressure regression equation.

Optionally, the visualization module 3 includes a visualization analysis unit 31 and a display screen 32.

The visualization analysis unit 31 is connected to the display screen 32 and is configured to perform at least one of the following steps: receiving the pressure value, determining the guidance information corresponding to the pressure value according to the pressure value, determining a pressure distribution display diagram according to the pressure value, sending the pressure distribution display diagram and the guidance information to the display screen 32, acquiring a current mattress air pressure of the electric mattress 2 and sending the current mattress air pressure to the display screen 32.

The display screen 32 is configured to receive and display at least one of the pressure distribution display diagram, the guidance information, or the current mattress air pressure.

In this embodiment, the pressure distribution display diagram may be a visually displayed image of each pressure value on the mattress.

Optionally, the visualization analysis unit 31 receives the pressure value corresponding to the each target position in the electric mattress 2, and the each pressure value is processed according to a preconfigured visualization intelligent algorithm to generate the pressure distribution display diagram. Further, the guidance information corresponding to the pressure value may also be determined according to the pressure value. To enable the caregiver to continue the monitoring, the pressure distribution display diagram may be sent to the display screen 32 so that the caregiver can monitor a pressure distribution state in real time through the display screen 32. Moreover, the guidance information may also be sent to the display screen 32 so that the display screen 32 can display the guidance information. The current mattress air pressure may also be displayed on the display screen 32 to intuitively determine the gap between the current mattress air pressure and the target mattress air pressure and facilitate the monitoring and timely adjustment.

Optionally, the anti-bedsore adjusting and monitoring system further includes a timing module 8 and a mode switching module 9.

The timing module 8 is connected to the mode switching module 9 and is configured to determine whether a working duration of the current working mode reaches a preset working duration corresponding to the current working mode, and generate and send a mode switching signal to the mode switching module based on a determination result that the working duration of the current working mode reaches the preset working duration corresponding to the current working mode; the mode switching module 9 is connected to the electric mattress 2 and is configured to switch a working mode of the electric mattress 2 based on a preset target working mode in response to receiving the mode switching signal.

In this embodiment, the current working mode may be a working mode that is currently being used by the electric mattress 2. The working duration may be a duration during which the current working mode is continuously used. The preset working duration may be the longest duration during which the current working mode may last. It is to be noted that the length of the preset working duration may be set separately according to different working modes. The mode switching signal may be a signal for triggering the switching of the working mode of the electric mattress 2. The target working mode may be a preset switchable working mode.

Optionally, the timing module 8 determines the current working mode of the electric mattress 2 and the working duration of the current working mode, determines whether the working duration of the current working mode reaches the preset working duration corresponding to the current working mode, continues timing and determining based on a determination result that the working duration of the current working mode does not reach the preset working duration corresponding to the current working mode, and generates and sends the mode switching signal to the mode switching module 9 based on the determination result that the working duration of the current working mode reaches the preset working duration corresponding to the current working mode. When receiving the mode switching signal, the mode switching module 9 determines a to-be-switched target working mode and switches the working mode of the electric mattress 2 to the target working mode.

Exemplarily, the current working mode is the static working mode, and the preset working duration corresponding to the static working mode is 10 min. When the timing module 8 determines that the working duration of the static working mode reaches 10 min, the mode switching signal is generated and sent to the mode switching module 9. When receiving the mode switching signal, the mode switching module 9 determines a to-be-switched target working mode as a turning-over working mode and controls the working mode of the electric mattress 2 to be switched to the turning-over working mode.

In this embodiment, the air pressure determination module determines the body mass index according to the height and the weight of the target object, determines the target mattress air pressure according to the body mass index and sends the target mattress air pressure to the electric mattress, the electric mattress receives the target mattress air pressure, performs the inflation or deflation processing according to the target mattress air pressure and acquires the pressure value corresponding to the each target position according to the target mattress air pressure and sends the pressure value to the visualization module, and the visualization module receives and visually displays the pressure value, determines the guidance information corresponding to the pressure value according to the pressure value and displays the guidance information. Moreover, the air pressure determination module determines the mattress inflation air pressure or the mattress deflation air pressure according to the target mattress air pressure and sends the mattress inflation air pressure or the mattress deflation air pressure to the electric mattress according to the preset cycle to automatically adjust the electric mattress. In this way, problems that the electric mattress cannot be monitored in real time and that regular muscle relaxation is required for users can be solved, the electric mattress with the suitable air pressure can be provided for the target object, the nursing workload required for muscle relaxation can be alleviated through cyclical inflation or deflation, and the bedsores can be avoided.

Embodiment Three

Figure 3:
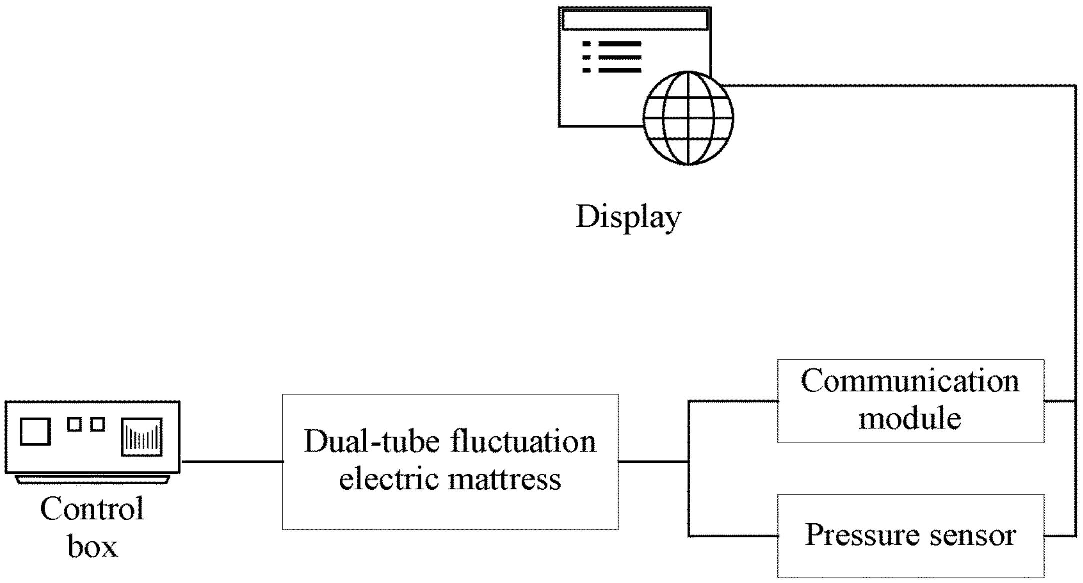
FIG. 3 is a diagram illustrating the structure of an anti-bedsore adjusting and monitoring system according to embodiment three of the present application.

FIG. 3 is a diagram illustrating the structure of an anti-bedsore adjusting and monitoring system according to embodiment three of the present application. The system includes a control box, a dual-tube fluctuation electric mattress, a communication module, a pressure sensor and a display.

Optionally, the control box may be provided with an air pressure determination module and others and is configured to control the dual-tube fluctuation electric mattress to inflate or deflate.

Through the communication module, the working state of the mattress may be observed in real time and remotely controlled so that the workload of a caregiver can be reduced, and the patient comfort can be increased. Meanwhile, informationalized data can facilitate medical scientific research activities and increase the bedsore prevention efficiency.

The caregiver may control the mattress state and the fluctuation cycle time through the control box and make adjustments according to actual cases. From the perspective of the safety of a patient, when the mattress is in a low-voltage state, a power-off state, or an unfilled state, the system may issue a warning to remind the caregiver to make adjustments timely.

Height and weight adaptive technology may be used in the control box. Everyone has different heights and weights, and different body parameters determine that everyone has different needs for the optimal pressure provided by the mattress. Since an air bed may disperse the pressure on the body, increase the contact area with the mattress and reduce the pressure applied to the skin, pressure sores can be reduced. A suitable air bed pressure may effectively alleviate the local tissue pressure and increase the patient comfort, so a target mattress air pressure is determined according to body mass parameters. For example, the target mattress air pressure may be obtained according to the input height and weight information. It is to be noted that the target mattress air pressure is determined according to the height and weight of a target object. Each set of weight and height corresponds to a respective target mattress air pressure. Before an electric anti-bedsore mattress is used, the weight and height of the target object may be input in advance so that the setting of the target mattress air pressure can be completed.

Figure 4:
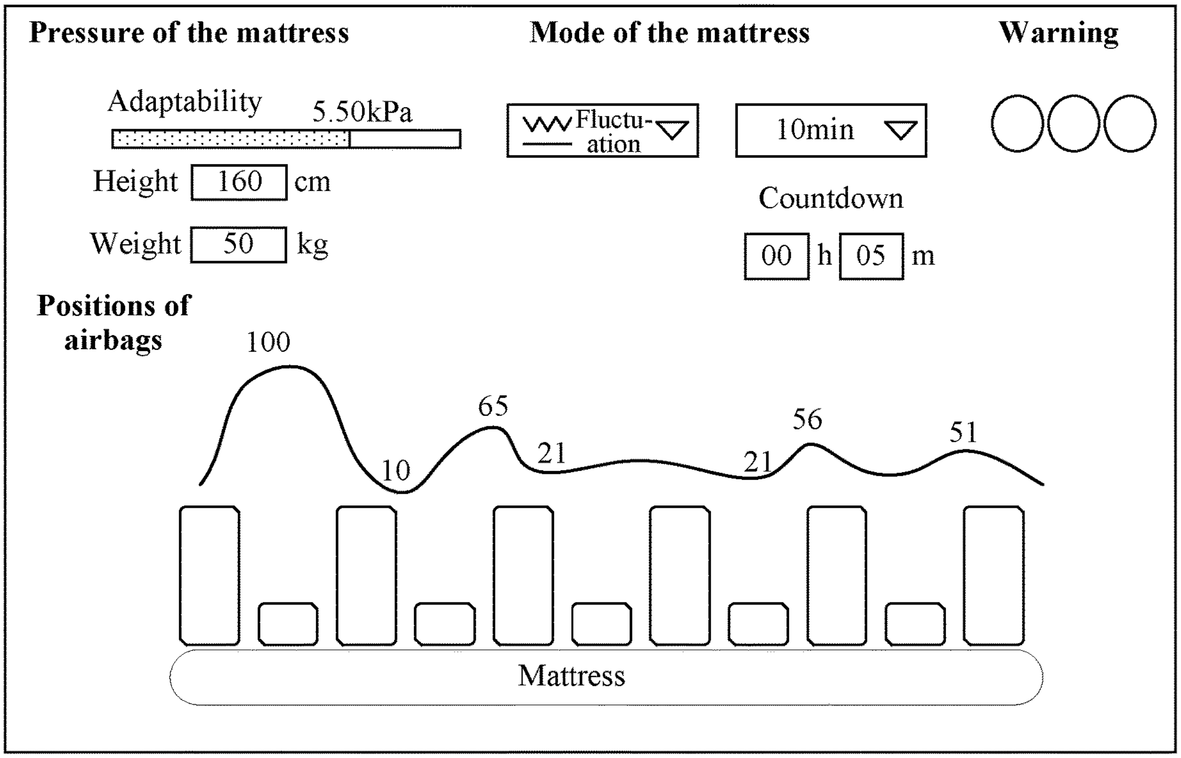
FIG. 4 is a diagram illustrating a display interface according to embodiment three of the present application.

The caregiver may perform visualization bedside pressure monitoring through the display and provide anti-bedsore risk guidance on the display. A display interface is shown in FIG. 4. When the target object lies on the mattress, the pressure sensor and a visualization intelligent algorithm are used for achieving continuous bedside pressure monitoring. This is used as a visual prompt to guide position changes.

Exemplarily, after the system is used for 2 h, 48 h, and 72 h, a supervising nurse may evaluate the skin pressure condition of the target object and ask the patient about the subjective feeling of the softness of the mattress. The skin pressure condition includes whether the skin is reddish due to pressure, and the patient's subjective feeling of the softness of the mattress includes satisfaction or dissatisfaction. Statistical software is used for data induction and processing, and a chi-squared test is used for data counting to conduct a linear correlation analysis between a body mass index and the mattress air pressure, and a linear regression analysis is used for constructing a regression equation to accurately determine the target mattress air pressure subsequently.

Moreover, the electric mattress helps the target object to regularly reduce the pressure through intermittent inflation and deflation. For example, due to sensory disturbance and decreased muscle tone, a hemiplegic patient has the nursing workload alleviated by an alternation fluctuation method so that the hemiplegic patient can relax his body parts, lie down more comfortably and alleviate the skin friction.

In the embodiment of the present application, the control box, the dual-tube fluctuation electric mattress, the communication module, the pressure sensor and the display construct the anti-bedsore adjusting and monitoring system. This solves problems in the related art that the use of the anti-bedsore mattress requires a nurse to spend a great deal of time on information statistics management, the working state of the mattress cannot be detected immediately, and the safety of the patient's bedsore prevention is relatively lacking so that the working state of the electric mattress can be monitored in real time and remotely controlled, an early warning feedback for an abnormal condition in the mattress can be sent immediately, the use safety can be improved, the adaptive pressure applicability can be provided for the patient, and the patient experience can be improved.

Embodiment Four

Figure 5:
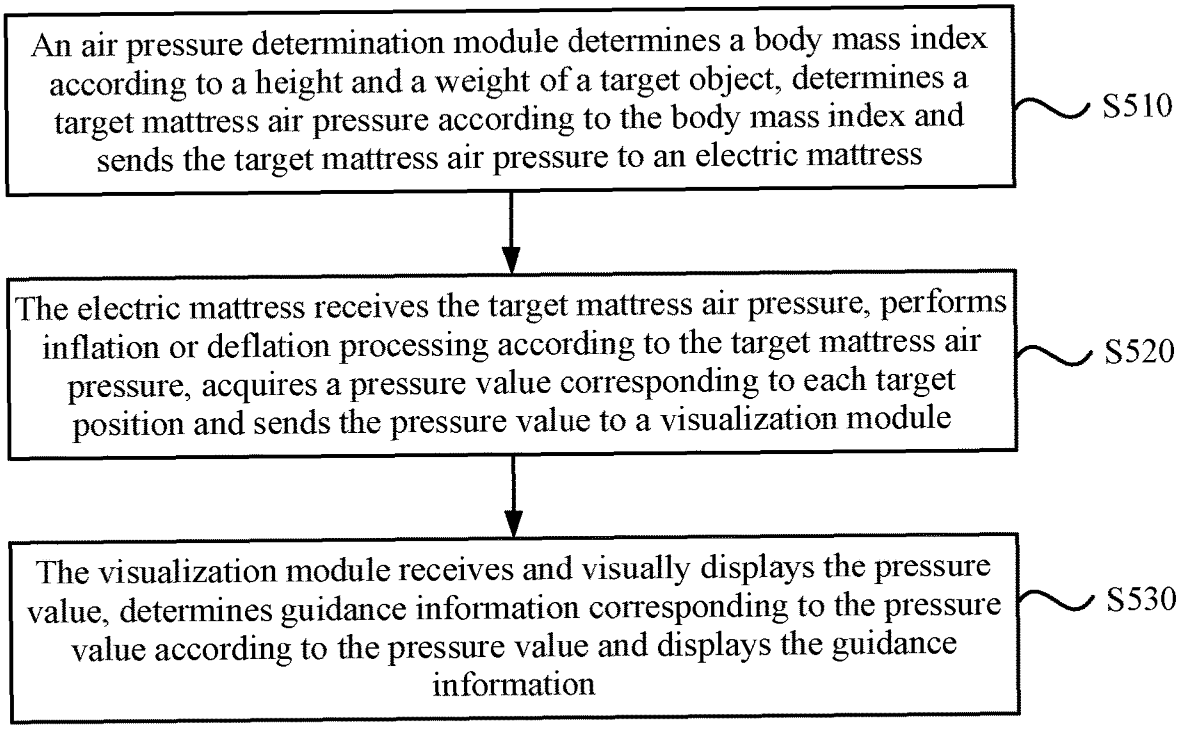
FIG. 5 is a flowchart of an anti-bedsore adjusting and monitoring method according to embodiment four of the present application.

FIG. 5 is a flowchart of an anti-bedsore adjusting and monitoring method according to embodiment four of the present application. This embodiment is applicable to the case of performing air pressure management on an electric mattress. The method may be performed by an anti-bedsore adjusting and monitoring system.

As shown in FIG. 5, the method in this embodiment includes the steps below.

In S510, an air pressure determination module determines a body mass index according to a height and a weight of a target object, determines a target mattress air pressure according to the body mass index and sends the target mattress air pressure to an electric mattress.

In S520, the electric mattress receives the target mattress air pressure, performs inflation or deflation processing according to the target mattress air pressure, acquires a pressure value corresponding to each target position and sends the pressure value to a visualization module.

The each target position is a position where a corresponding pressure sensor in the electric mattress contacts the target object.

In S530, the visualization module receives and visually displays the pressure value, determines guidance information corresponding to the pressure value according to the pressure value and displays the guidance information.

Optionally, the air pressure determination module determines a mattress inflation air pressure and a mattress deflation air pressure according to the target mattress air pressure and sends the mattress inflation air pressure or the mattress deflation air pressure to the electric mattress according to a preset cycle; the electric mattress receives the mattress inflation air pressure or the mattress deflation air pressure and performs the inflation or deflation processing according to the mattress inflation air pressure or the mattress deflation air pressure.

Optionally, the visualization module receives and visually displays the pressure value and generates and displays, in response to the pressure value reaching a guidance condition, guidance information corresponding to the guidance condition.

Optionally, the anti-bedsore adjusting and monitoring system further includes a mode adjustment module. The mode adjustment module may receive the pressure value and switch, in response to the pressure value reaching a mode switching condition, the working mode of the electric mattress.

Optionally, the air pressure determination module may determine at least one to-be-adjusted airbag corresponding to each target moment within a fluctuation cycle mode and airbag air pressures corresponding to the at least one to-be-adjusted airbag according to the target mattress air pressure and send the airbag air pressures of the at least one to-be-adjusted airbag corresponding to the each target moment to the electric mattress at the each target moment, where the electric mattress includes at least two airbags; the electric mattress receives the airbag air pressures corresponding to the at least one to-be-adjusted airbag and inflates or deflates each to-be-adjusted airbag according to an airbag air pressure corresponding to the each to-be-adjusted airbag in the fluctuation cycle mode.

Optionally, the electric mattress includes an air pressure control unit, an inflator and at least two airbags. The air pressure control unit receives the target mattress air pressure and controls the inflator to inflate or deflate the at least two airbags according to the target mattress air pressure so that air pressures in the at least two airbags can reach the target mattress air pressure.

Optionally, the anti-bedsore adjusting and monitoring system further includes a warning module.

The warning module generates and sends warning information in response to detecting a to-be-wamed situation, where the to-be-warned situation includes the electric mattress being in a low-voltage state, a power-off state, or an unfilled state.

Optionally, the warning module may also acquire the pressure value corresponding to the each target position in the electric mattress, determine the current pressure state according to the pressure value and a comfort pressure value and generate and send reminder information in response to the current pressure state being uncomfortable.

Optionally, the anti-bedsore adjusting and monitoring system further includes a feedback adjustment module. The feedback adjustment module may acquire the pressure value corresponding to the each target position in the electric mattress, determine the current pressure state according to the pressure value and the comfort pressure value, determine a feedback mattress air pressure according to the pressure value and the comfort pressure value in response to the current pressure state being uncomfortable and send the feedback mattress air pressure to the electric mattress; the electric mattress receives the feedback mattress air pressure and performs the inflation or deflation processing according to the feedback mattress air pressure.

Optionally, the anti-bedsore adjusting and monitoring system further includes an air pressure iteration module. The air pressure iteration module may acquire a skin pressure condition and a subjective feeling of the target object, update an air pressure regression equation according to the body mass index, the skin pressure condition and the subjective feeling and send the updated air pressure regression equation to the air pressure determination module, where the air pressure regression equation is configured to determine the target mattress air pressure according to the body mass index.

Optionally, the visualization module includes a visualization analysis unit and a display screen.

The visualization analysis unit is configured to perform at least one of the following: receive the pressure value, determine the guidance information corresponding to the pressure value according to the pressure value, determine a pressure distribution display diagram according to the pressure value, send the pressure distribution display diagram and the guidance information to the display screen, acquire the current mattress air pressure of the electric mattress and send the current mattress air pressure to the display screen.

The display screen may receive and display at least one of the pressure distribution display diagram, the guidance information, or the current mattress air pressure.

Optionally, the anti-bedsore adjusting and monitoring system further includes a timing module and a mode switching module. The timing module may determine whether a working duration of the current working mode reaches a preset working duration corresponding to the current working mode, and generate and send a mode switching signal to the mode switching module based on a determination result that the working duration of the current working mode reaches the preset working duration corresponding to the current working mode; the mode switching module switches the current working mode of the electric mattress based on a preset target working mode in response to receiving the mode switching signal.

In this embodiment, the air pressure determination module determines the body mass index according to the height and the weight of the target object, determines the target mattress air pressure according to the body mass index and sends the target mattress air pressure to the electric mattress, the electric mattress receives the target mattress air pressure, performs the inflation or deflation processing according to the target mattress air pressure and acquires the pressure value corresponding to the each target position according to the target mattress air pressure and sends the pressure value to the visualization module, and the visualization module receives and visually displays the pressure value, determines the guidance information corresponding to the pressure value according to the pressure value and displays the guidance information. This approach solves the problems of real-time monitoring of the electric mattress and the provision of suitable mattress air pressures for different users. This approach enables providing an electric mattress with suitable air pressure for the target object, alleviating nursing workload, and avoiding bedsores.

What is claimed is:

1. An anti-bedsore adjusting and monitoring system, comprising an air pressure determination module, an electric mattress and a visualization module, wherein the air pressure determination module is communicatively connected to the electric mattress and is configured to determine a body mass index according to a height and a weight of a target object, determine a target mattress air pressure according to the body mass index and send the target mattress air pressure to the electric mattress;

the electric mattress is communicatively connected to the visualization module and is configured to receive the target mattress air pressure, perform inflation or deflation processing according to the target mattress air pressure, acquire a pressure value corresponding to each target position and send the pressure value to the visualization module, wherein the each target position is a position where a corresponding pressure sensor in the electric mattress contacts the target object;

the visualization module is configured to receive and visually display the pressure value, determine guidance information corresponding to the pressure value according to the pressure value and display the guidance information; and an air pressure iteration module connected to the air pressure determination module and configured to acquire a skin pressure condition and the target object's decision between satisfaction and dissatisfaction with the target mattress air pressure, update an air pressure regression equation according to the body mass index, the skin pressure condition and the target object's decision between satisfaction and dissatisfaction with the target mattress air pressure, and send an updated air pressure regression equation to the air pressure determination module, wherein the air pressure regression equation is used to determine the target mattress air pressure according to the body mass index.

2. The system according to claim 1, wherein the air pressure determination module is further configured to determine a mattress inflation air pressure or a mattress deflation air pressure according to the target mattress air pressure and send the mattress inflation air pressure or the mattress deflation air pressure to the electric mattress according to a preset cycle; and the electric mattress is further configured to receive the mattress inflation air pressure or the mattress deflation air pressure and perform the inflation or deflation processing according to the mattress inflation air pressure or the mattress deflation air pressure.

3. The system according to claim 1, wherein the visualization module is configured to receive and visually display the pressure value, generate guidance information corresponding to a guidance condition in response to the pressure value reaching the guidance condition, and display the guidance information.

4. The system according to claim 1, further comprising:

a mode adjustment module connected to the electric mattress, and configured to receive the pressure value and switch, in response to the pressure value reaching a mode switching condition, a working mode of the electric mattress.

5. The system according to claim 1, wherein the air pressure determination module is further configured to determine at least one to-be-adjusted airbag corresponding to each target moment within a fluctuation cycle mode and an airbag air pressure corresponding to each of the at least one to-be-adjusted airbag according to the target mattress air pressure, and send the airbag air pressure of each of the at least one to-be-adjusted airbag corresponding to the each target moment to the electric mattress at the each target moment, wherein the electric mattress comprises at least two airbags; and the electric mattress is further configured to, in the fluctuation cycle mode, receive the airbag air pressure corresponding to each of the at least one to-be-adjusted airbag, and inflate or deflate each of the at least one to-be-adjusted airbag according to an airbag air pressure corresponding to the each of the at least one to-be-adjusted airbag.

6. The system according to claim 1, wherein the electric mattress comprises an air pressure control unit, an inflator and airbags, wherein the air pressure control unit is communicatively connected to the air pressure determination module and is configured to receive the target mattress air pressure and control the inflator to inflate or deflate the airbags according to the target mattress air pressure to enable an air pressure in each of the airbags to reach the target mattress air pressure.

7. The system according to claim 1, further comprising:

a warning module connected to the electric mattress and configured to generate and send warning information in response to detecting a to-be-warned situation, wherein the to-be-warned situation comprises a situation where the electric mattress is in a low-voltage state, a power-off state, or an unfilled state.

8. The system according to claim 7, wherein the warning module is further configured to:

acquire the pressure value corresponding to the each target position in the electric mattress and determine, according to the pressure value and a preset pressure value threshold, a current pressure state; and generate and send reminder information in response to the pressure value being not less than the preset pressure value threshold.

9. The system according to claim 1, further comprising:

a feedback adjustment module connected to the electric mattress and configured to acquire the pressure value corresponding to the each target position in the electric mattress, determine a current pressure state according to the pressure value and a preset pressure value threshold, determine a feedback mattress air pressure according to the pressure value and the preset pressure value threshold in response to the pressure value being not less than the preset pressure value threshold, and send the feedback mattress air pressure to the electric mattress; and the electric mattress is further configured to receive the feedback mattress air pressure and perform the inflation or deflation processing according to the feedback mattress air pressure.

10. The system according to claim 1, wherein the visualization module comprises a visualization analysis unit and a display screen, wherein the visualization analysis unit is connected to the display screen and is configured to perform at least one of following steps:

receiving the pressure value, determining the guidance information corresponding to the pressure value according to the pressure value, determining a pressure distribution display diagram according to the pressure value, sending the pressure distribution display diagram and the guidance information to the display screen, acquiring a current mattress air pressure of the electric mattress and sending the current mattress air pressure to the display screen;

wherein the display screen is configured to receive and display at least one of the pressure distribution display diagram, the guidance information, or the current mattress air pressure.

11. The system according to claim 1, further comprising:

a timing module and a mode switching module, wherein the timing module is connected to the mode switching module and is configured to determine whether a working duration of a current working mode reaches a preset working duration corresponding to the current working mode, and generate and send a mode switching signal to the mode switching module based on a determination result that the working duration of the current working mode reaches the preset working duration corresponding to the current working mode; and wherein the mode switching module is connected to the electric mattress and is configured to switch a working mode of the electric mattress based on a preset target working mode in response to receiving the mode switching signal.

12. An anti-bedsore adjusting and monitoring method, comprising:

determining, by an air pressure determination module, a body mass index according to a height and a weight of a target object, determining, by an air pressure determination module, a target mattress air pressure according to the body mass index and sending, by an air pressure determination module, the target mattress air pressure to an electric mattress;

receiving, by the electric mattress, the target mattress air pressure, performing, by the electric mattress, inflation or deflation processing according to the target mattress air pressure, and acquiring, by the electric mattress, a pressure value corresponding to each target position and sending, by the electric mattress, the pressure value to a visualization module, wherein the each target position is a position where a corresponding pressure sensor in the electric mattress contacts the target object;

receiving and visually displaying, by the visualization module, the pressure value, determining, by the visualization module, guidance information corresponding to the pressure value according to the pressure value, and displaying, by the visualization module, the guidance information; and acquiring a skin pressure condition and the target object's decision between satisfaction and dissatisfaction with the target mattress air pressure, updating an air pressure regression equation according to the body mass index, the skin pressure condition and the target object's decision between satisfaction and dissatisfaction with the target mattress air pressure, and sending an updated air pressure regression equation to the air pressure determination module, wherein the air pressure regression equation is used to determine the target mattress air pressure according to the body mass index.

13. The method according to claim 12, further comprising:

determining, by the air pressure determination module, a mattress inflation air pressure or a mattress deflation air pressure according to the target mattress air pressure, and sending, by the air pressure determination module, the mattress inflation air pressure or the mattress deflation air pressure to the electric mattress according to a preset cycle; and receiving, by the electric mattress, the mattress inflation air pressure or the mattress deflation air pressure, and performing, by the electric mattress, the inflation or deflation processing according to the mattress inflation air pressure or the mattress deflation air pressure.

14. The method according to claim 12, wherein receiving and visually displaying, by the visualization module, the pressure value, determining, by the visualization module, the guidance information corresponding to the pressure value according to the pressure value, and displaying, by the visualization module, the guidance information comprises:

receiving and visually displaying, by the visualization module, the pressure value, generating, by the visualization module, guidance information corresponding to a guidance condition in response to the pressure value reaching the guidance condition, and displaying, by the visualization module, the guidance information.

15. The method according to claim 12, wherein a mode adjustment module is connected to the electric mattress;

the method further comprises:

receiving, by the mode adjustment module, the pressure value, and switching, by the mode adjustment module in response to the pressure value reaching a mode switching condition, a working mode of the electric mattress.

16. The method according to claim 12, wherein the electric mattress comprises an air pressure control unit, an inflator and airbags, and the air pressure control unit is communicatively connected to the air pressure determination module;

the method further comprises:

receiving, by the air pressure control unit, the target mattress air pressure, and controlling, by the air pressure control unit, the inflator to inflate or deflate the airbags according to the target mattress air pressure to enable an air pressure in each of the airbags to reach the target mattress air pressure.

17. The method according to claim 12, wherein a warning module connected to the electric mattress;

the method further comprises:

generating and sending, by the warning module, warning information in response to detecting a to-be-warned situation, wherein the to-be-warned situation comprises a situation where the electric mattress is in a low-voltage state, a power-off state, or an unfilled state.

18. The method according to claim 17, further comprising:

acquiring, by the warning module, the pressure value corresponding to the each target position in the electric mattress and determining, by the warning module according to the pressure value and a preset pressure value threshold, a current pressure state; and generating and sending, by the warning module, reminder information in response to the pressure value being not less than the preset pressure value threshold.

19. The system according to claim 12, wherein a feedback adjustment module is connected to the electric mattress;

acquiring, by the feedback adjustment module, the pressure value corresponding to the each target position in the electric mattress, determining, by the feedback adjustment module, a current pressure state according to the pressure value and a preset pressure value threshold, determining, by the feedback adjustment module, a feedback mattress air pressure according to the pressure value and the preset pressure value threshold in response to the pressure value being not less than the preset pressure value threshold, and sending, by the feedback adjustment module, the feedback mattress air pressure to the electric mattress; and receiving, by the electric mattress, the feedback mattress air pressure, and performing, by the electric mattress, the inflation or deflation processing according to the feedback mattress air pressure.

* * * * *